US012720170B2

(12) United States Patent
Li et al.

(10) Patent No.: US 12,720,170 B2
(45) Date of Patent: Aug. 25, 2026

(54) VIDEO GENERATION METHOD AND APPARATUS, COMPUTER DEVICE, AND STORAGE MEDIUM

(71) Applicant: Beijing Zitiao Network Technology Co., Ltd., Beijing (CN)

(72) Inventors: Xiaojie Li, Beijing (CN); Jiancheng Liu, Beijing (CN); Liangjie Xie, Beijing (CN); Yuhao Zheng, Beijing (CN); Haoyuan Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 45 days.

(21) Appl. No.: 18/679,240

(22) Filed: May 30, 2024

(65) Prior Publication Data

US 2024/0406517 A1 Dec. 5, 2024

(30) Foreign Application Priority Data

May 31, 2023 (CN) ........................ 202310638116.7

(51) Int. Cl.
*H04N 21/81* (2011.01)
*H04N 21/431* (2011.01)
*H04N 21/466* (2011.01)

(52) U.S. Cl.
CPC ....... *H04N 21/816* (2013.01); *H04N 21/4318* (2013.01); *H04N 21/4668* (2013.01)

(58) Field of Classification Search
CPC ............. H04N 21/816; H04N 21/4318; H04N 21/4668
See application file for complete search history.

(56) References Cited

U.S. PATENT DOCUMENTS

2021/0005223 A1* 1/2021 Wang .................... G06F 3/0482
2021/0006867 A1* 1/2021 Liu .................... H04N 21/4316
(Continued)

FOREIGN PATENT DOCUMENTS

CN 111259635 A 6/2020
CN 111435270 A 7/2020
(Continued)

OTHER PUBLICATIONS

Office Action for Chinese Patent Application No. 202310638116.7, mailed on Jul. 17, 2025, 19 pages.
(Continued)

*Primary Examiner* — Mulugeta Mengesha
(74) *Attorney, Agent, or Firm* — Astute IP Law Group

(57) ABSTRACT

A video generation method and apparatus, a computer device, and a storage medium are provided in the present disclosure. The method includes: displaying a video creation page in response to a request to generate a recommendation video for a target book list, the video creation page including editing instructions respectively corresponding to video forming dimensions, and the editing instructions being used to guide to add target video materials in the video forming dimensions; and in response to receiving the target video materials in the video forming dimensions, integrating the target video materials by using a target video script, to generate the recommendation video corresponding to the target book list, the target video script indicating a target video frame associated with a video forming dimension in the recommendation video, and a display position of a target video material corresponding to the video forming dimension in the target video frame.

20 Claims, 9 Drawing Sheets

(56) References Cited

U.S. PATENT DOCUMENTS

2021/0117471 A1* 4/2021 Rav-Acha ........... G06F 16/7837
2022/0383907 A1* 12/2022 Zhang ................ H04N 21/8547
2023/0057703 A1* 2/2023 Lyu ...................... G11B 27/031
2024/0012541 A1* 1/2024 Liu ....................... G06F 3/0482

FOREIGN PATENT DOCUMENTS

| | | | |
|---|---|---|---|
| CN | 111970571 | A | 11/2020 |
| CN | 113452941 | A | 9/2021 |
| CN | 113536172 | A | 10/2021 |
| CN | 113660526 | A | 11/2021 |
| CN | 113709575 | A | 11/2021 |
| CN | 114297506 | A | 4/2022 |
| CN | 115357753 | A | 11/2022 |
| WO | 2023016391 | A1 | 2/2021 |
| WO | 2022126664 | A1 | 6/2022 |

OTHER PUBLICATIONS

Office Action for Chinese Patent Application No. 202310638116.7, mailed on Nov. 21, 2025, 20 pages.

Weixin_39611722, "5 Android input method keyboard display Search_Sogou input method 10.16 has been fully upgraded, officially announcing that it has entered the era of AI writing assistants.", CSDN, Dec. 12, 2020, 6 pages.

Notice of Allowance for Chinese Patent Application No. 202310638116.7, mailed on May 1, 2026, 8 pages.

Yang et al., "Re3: Generating Longer StoriesWith Recursive Reprompting and Revision", arXiv:2210.06774v3 [cs.CL], Oct. 22, 2022, 86 pages.

* cited by examiner displaying a video creation page in response to a request to generate a recommendation video for a target book list, the video creation page including editing instructions respectively corresponding to a plurality of video forming dimensions, and the editing instructions being used to guide to add target video materials in the video forming dimensions — S101

↓ in response to receiving the target video materials in the video forming dimensions, integrating the target video materials by using a target video script, to generate the recommendation video corresponding to the target book list, the target video script indicating a target video frame associated with a video forming dimension in the recommendation video, and a display position of a target video material corresponding to the video forming dimension in the target video frame — S102

FIG. 1

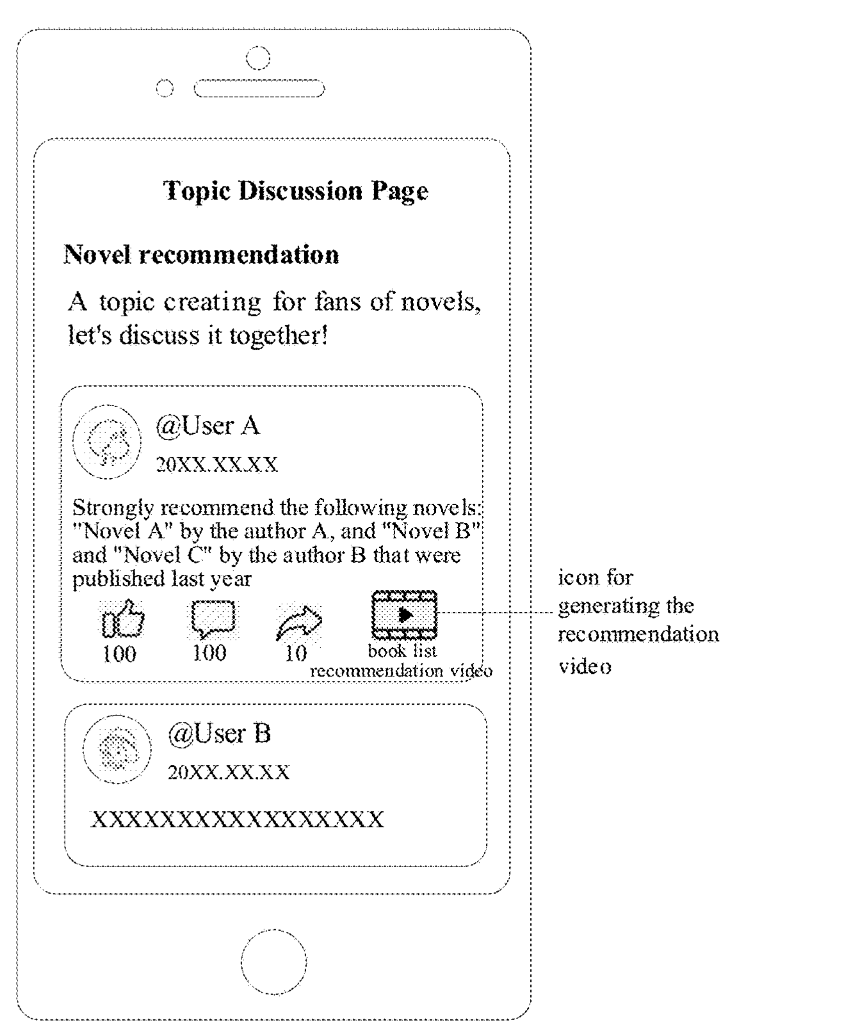

FIG. 2

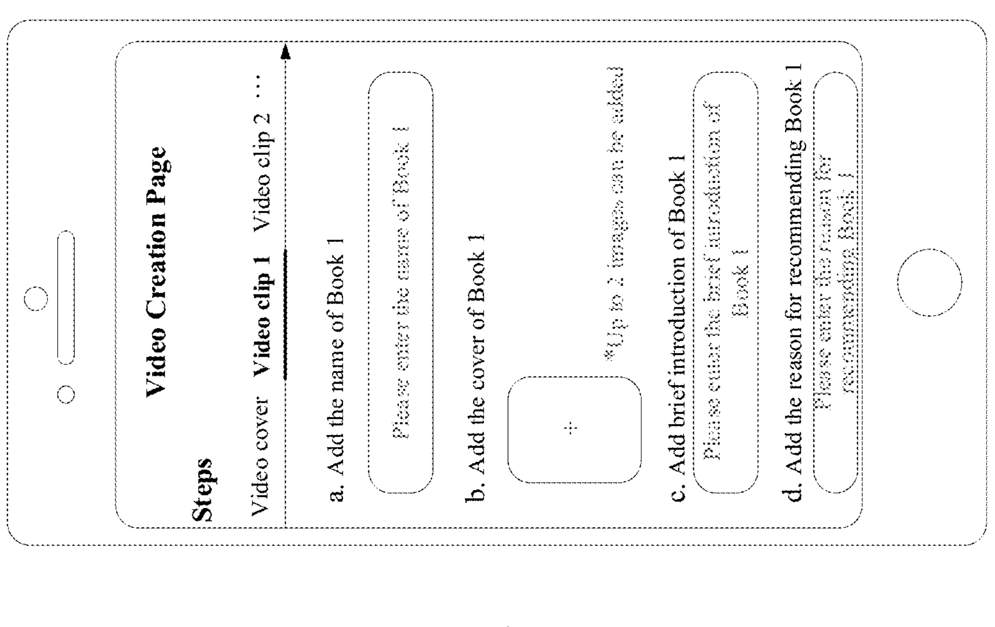
FIG. 3（b）
FIG. 3（a）

VIDEO GENERATION METHOD AND APPARATUS, COMPUTER DEVICE, AND STORAGE MEDIUM

CROSS-REFERENCE TO RELATED APPLICATION

This application claims priority to Chinese Patent Application No. 202310638116.7, filed on May 31, 2023, which is incorporated herein by reference in its entirety as a part of this application.

TECHNICAL FIELD

The present disclosure relates to the field of video creation technologies, and specifically, to a video generation method and apparatus, a computer device, and a storage medium.

BACKGROUND

In the process of creating a video, such as creating a recommendation video for a book list, in some manners, a user may collect various data required for introducing the book list, and then import the data in the form of pictures and text through video edit software, so that the video edit software can compile the information into video frames, to constitute a recommendation video that includes book list introduction information.

In the foregoing manner, tools that can be provided for the user are relatively limited, the video edit software can provide only the video edit function, and the user also needs to conceive a video structure of a created video, and also needs to collect and organize book list content to be arranged into the video, so as to use the video edit software to create the introduction video, and the operation is also complex.

SUMMARY

The embodiments of the present disclosure provide a video generation method and apparatus, a computer device, and a storage medium.

In a first aspect, the embodiments of the present disclosure provide a video generation method, including: displaying a video creation page in response to a request to generate a recommendation video for a target book list, in which the video creation page includes editing instructions respectively corresponding to a plurality of video forming dimensions, and the editing instructions are used to guide to add target video materials in the video forming dimensions; and in response to receiving the target video materials in the video forming dimensions, integrating the target video materials by using a target video script, to generate the recommendation video corresponding to the target book list, in which the target video script indicates a target video frame associated with a video forming dimension in the recommendation video, and a display position of a target video material corresponding to the video forming dimension in the target video frame.

In an optional implementation, after displaying the editing instructions in the video creation page, the method further includes: in response to a trigger operation on any editing instruction, obtaining at least one first reference material in a video forming dimension that corresponds to the editing instruction and that is associated with the target book list; and in response to a selection operation on the first reference material, using the selected first reference material as a target video material in the video forming dimension.

In an optional implementation, after displaying the editing instructions in the video creation page, the method further includes: in response to receiving input information under any editing instruction, determining, based on a video forming dimension corresponding to the editing instruction, a plurality of book description dimensions corresponding to the target book list, and determining, based on the input information, a target book description dimension from the plurality of book description dimensions; and obtaining book information in the target book description dimension from the target book list, and displaying the book information and the input information in an associated manner.

In an optional implementation, in response to receiving the target video materials in the video forming dimensions, the method further includes: displaying identification information respectively corresponding to a plurality of video scripts, in which the identification information includes first identification information and second identification information; generating a first preview video in response to a selection operation on the first identification information based on a video script corresponding to the first identification information, and the target video materials in the video forming dimensions; and displaying the first preview video, and switching, in response to a switch selection operation on the second identification information, to display a second preview video under a video script corresponding to the second identification information.

In an optional implementation, the displaying identification information respectively corresponding to a plurality of video scripts further includes: determining a book list type of the target book list, to determine a video style matching the target book list based on the book list type, in which the book list type of the target book list is determined based on a book type corresponding to a plurality of books in the target book list; and determining the target video script matching the video style from the plurality of video scripts, and displaying identification information corresponding to the target video script in a recommended manner.

In an optional implementation, the video forming dimensions include a background sound dimension, and a target video material in the background sound dimension is obtained in the following manner: in response to receiving an edit operation on an editing instruction in the background sound dimension, determining a selected to-be-recorded audio clip in background audio in the recommendation video; playing a currently generated preview video, and receiving recorded audio for the to-be-recorded audio clip when playing to a video clip corresponding to the to-be-recorded audio clip in the preview video; and updating the to-be-recorded audio clip by using the recorded audio, to obtain the video material in the background sound dimension.

In an optional implementation, after generating the recommendation video corresponding to the target book list, the method further includes: playing the recommendation video on a video recommendation page, and marking, in a progress bar of the recommendation video, a video clip that is associated with each book in the target book list and that is in the recommendation video; and in response to a selection operation on any video clip, jumping to a start play position of the video clip in the recommendation video and playing from the starting position, and displaying read information of a book associated with the video clip.

In a second aspect, the embodiments of the present disclosure provide a video generation apparatus, including a display module and a generation module. The display module is configured to display a video creation page in response to a request to generate a recommendation video for a target book list, in which the video creation page includes editing instruction respectively corresponding to a plurality of video forming dimensions, and the editing instruction are used to guide to add target video materials in the video forming dimensions. The generation module is configured to, in response to receiving the target video materials in the video forming dimensions, integrate the target video materials by using a target video script, to generate the recommendation video corresponding to the target book list, in which the target video script indicates a target video frame associated with a video forming dimension in the recommendation video, and a display position of a target video material corresponding to the video forming dimension in the target video frame.

In an optional implementation, after displaying the editing instructions in the video creation page, the display module is further configured to: in response to a trigger operation on any editing instruction, obtain at least one first reference material in a video forming dimension that corresponds to the editing instruction and that is associated with the target book list; and in response to a selection operation on the first reference material, use the selected first reference material as a target video material in the video forming dimension.

In an optional implementation, after displaying the editing instructions in the video creation page, the display module is further configured to: in response to receiving input information under any editing instruction, determine, based on a video forming dimension corresponding to the editing instruction, a plurality of book description dimensions corresponding to the target book list, and determine, based on the input information, a target book description dimension from the plurality of book description dimensions; and obtain book information in the target book description dimension from the target book list, and display the book information and the input information in an associated manner.

In an optional implementation, after responding to receiving the target video materials in the video forming dimensions, the generation module is further configured to: display identification information respectively corresponding to a plurality of video scripts, in which the identification information includes first identification information and second identification information, and generate a first preview video in response to a selection operation on the first identification information based on a video script corresponding to the first identification information, and the target video materials in the video forming dimensions; and display the first preview video, and switch, in response to a switch selection operation on the second identification information, to display a second preview video under a video script corresponding to the second identification information.

In an optional implementation, when displaying the identification information respectively corresponding to the plurality of video scripts, the generation module is further configured to: determine a book list type of the target book list, to determine a video style matching the target book list based on the book list type, in which the book list type of the target book list is determined based on a book type corresponding to a plurality of books in the target book list; and determine the target video script matching the video style from the plurality of video scripts, and display identification information corresponding to the target video script in a recommended manner.

In an optional implementation, the video forming dimensions include a background sound dimension, and the generation module obtains a target video material in the background sound dimension in the following manner: in response to receiving an edit operation on an editing instruction in the background sound dimension, determining a selected to-be-recorded audio clip in background audio in the recommendation video; playing a currently generated preview video, and receiving recorded audio for the to-be-recorded audio clip when playing to a video clip corresponding to the to-be-recorded audio clip in the preview video; and updating the to-be-recorded audio clip by using the recorded audio, to obtain the video material in the background sound dimension.

In an optional implementation, after generating the recommendation video corresponding to the target book list, the generation module is further configured to: play the recommendation video on a video recommendation page, and mark, in a progress bar of the recommendation video, a video clip that is associated with each book in the target book list and that is in the recommendation video; and in response to a selection operation on any video clip, jump to a start play position of the video clip in the recommendation video and play from the starting position, and display read information of a book associated with the video clip.

In a third aspect, the embodiments of the present disclosure provide a computer device, including: a processor and a memory, in which the memory stores a machine-readable instruction that can be executed by the processor, the processor is configured to execute the machine-readable instruction stored in the memory, and when the machine-readable instruction is executed by the processor, the processor performs the steps of the video generation method in the first aspect or any possible implementation of the first aspect.

In a fourth aspect, the embodiments of the present disclosure provide a computer-readable storage medium, in which the computer-readable storage medium stores a computer program, and when the computer program is run by a computer device, the computer device performs the steps of the video generation method in the first aspect or any possible implementation of the first aspect.

A video generation method and apparatus, a computer device, and a storage medium that are provided in embodiments of the present disclosure provide a video creation page for creation of a recommendation video corresponding to a target book list, so as to facilitate creation of the recommendation video by a user. The video creation page specifically displays editing instructions corresponding to a plurality of video forming dimensions involved during creation of the recommendation video of the target book list. The editing instructions can guide the user to add video materials used for constructing the video, and the user does not need to conceive which information needs to be collected. In addition, after target video materials in the video forming dimensions are received, the target video materials may be directly integrated by using a target video script, and the target video script specifically indicates a display video frame and a display position of the video materials in the recommendation video, and therefore the user can directly obtain the arranged and organized recommendation video without arranging book list content. In this way, the user operation is also easier.

In order to make the foregoing objectives, features and advantages of the present disclosure more obvious and understandable, the following provides detailed descriptions by using preferred embodiments in cooperation with the accompanying drawings.

BRIEF DESCRIPTION OF DRAWINGS

In order to more clearly describe the technical solutions of embodiments of the present disclosure, the following briefly describes the accompanying drawings to be used in embodiments. The accompanying drawings herein are incorporated in this specification and form a part of this specification, show embodiments consistent with the present disclosure, and are used together with this specification to describe the technical solutions of the present disclosure. It should be understood that the following accompanying drawings show only some embodiments of the present disclosure, and therefore should not be regarded as limiting the scope, and a person of ordinary skill in the art may further obtain other relevant accompanying drawings from these accompanying drawings without creative efforts.

FIG. 1 is a flowchart of a video generation method according to an embodiment of the present disclosure;

FIG. 2 is a schematic diagram corresponding to an icon that is for generating a recommendation video and that is displayed on a topic discussion page according to an embodiment of the present disclosure;

FIGS. 3(*a*) and 3(*b*) are schematic diagrams of a video creation page according to an embodiment of the present disclosure;

DETAILED DESCRIPTION

Figure 4:
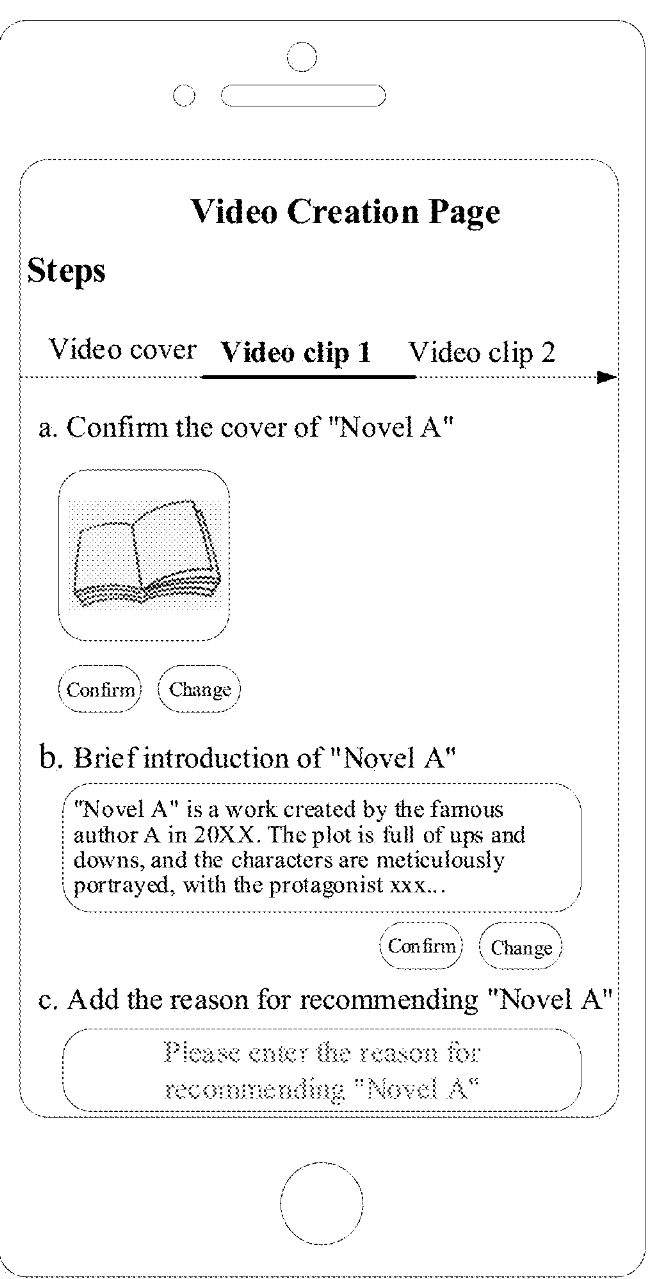
FIG. 4 is a schematic diagram of another video creation page according to an embodiment of the present disclosure.

To make the objectives, technical solutions, and advantages of embodiments of the present disclosure clearer, the following clearly and completely describes the technical solutions in embodiments of the present disclosure with reference to the accompanying drawings in embodiments of the present disclosure. Apparently, the described embodiments are merely some rather than all of the embodiments of the present disclosure. The components in embodiments of the present disclosure described and shown herein may be usually arranged and designed in a variety of different configurations. Therefore, the following detailed descriptions of embodiments of the present disclosure are not intended to limit the scope of the present disclosure for which protection is claimed, but rather represents only selected embodiments of the present disclosure. Based on embodiments of the present disclosure, all other embodiments obtained by a person skilled in the art without creative efforts fall within the protection scope of the present disclosure.

It is found through research that, in the process of generating a recommendation video for a book list, a user may select video edit software, and edit, by using a video edit function in the video edit software, book list related data collected by the user into a video frame, to generate the recommendation video. However, tools that can be provided for the user are limited in this manner. Because the user can create a video only by using a video edit tool and the video edit software can provide only the video edit function, the user further needs to conceive a video structure of a created video, and also needs to collect and organize book list content to be compiled into the video, so as to use the video edit software to create the introduction video, and the operation is also complex.

Based on the foregoing research, the present disclosure provides a video generation method that provides a video creation page for creation of a recommendation video corresponding to a target book list, so as to facilitate creation of the recommendation video by the user. The video creation page specifically displays editing instructions corresponding to a plurality of video forming dimensions involved during creation of the recommendation video of the target book list. The editing instructions can guide the user to add video materials used for constructing the video, and the user does not need to conceive which information needs to be collected. In addition, after target video materials in the video forming dimensions are received, the target video materials may be directly integrated by using a target video script, and the target video script specifically indicates a display video frame and a display position of the video materials in the recommendation video, and therefore the user can directly obtain the arranged and organized recommendation video without arranging book list content. In this way, the user operation is also easier.

The defects that exist in the foregoing solutions are all results of the inventor's practice and careful study. Therefore, the process of discovery of the foregoing problems and the solutions proposed in the present disclosure hereinafter for the foregoing problems should be the inventor's contribution to the present disclosure in the process of the present disclosure.

It should be noted that similar reference numerals and letters indicate similar items in the following accompanying drawings, so that once an item is defined in one accompanying drawing, it does not need to be further defined and explained in subsequent accompanying drawings.

To facilitate the understanding of this embodiment, a video generation method disclosed in this embodiment of the present disclosure is first described in detail, and an execution body of the video generation method provided in this embodiment of the present disclosure is generally a computer device having a particular computing capability. The computer device includes, for example, a terminal device, a server, or another processing device, and the terminal device may be a user equipment (UE), a mobile device, a user terminal, a terminal, a cellular telephone, a cordless telephone, a personal digital assistant (PDA), a handheld device, a computing device, a vehicle-mounted device, a wearable device, or the like. In some possible implementations, the video generation method may be implemented by a processor by invoking a computer-readable instruction stored in a memory.

The following describes the video generation method provided in this embodiment of the present disclosure. Because the video generation method provided in this embodiment of the present invention relates to a book list and video playing, the method may be specifically applied to a book reading platform and a commodity selling platform that are related to the book list, and a video playing platform that is related to video playing. For example, using the book reading platform as an example, an entry for video editing on an involved book list may be provided on a book list recommendation page for recommending a book list, or on a topic discussion page for discussing the book list, and the involved book list is selected as a target book list for which a recommendation video is to be generated.

FIG. 1 is a flowchart of a video generation method according to an embodiment of the present disclosure. The method includes steps S101 and S102.

S101: displaying a video creation page in response to a request to generate a recommendation video for a target book list, the video creation page including editing instructions respectively corresponding to a plurality of video forming dimensions, and the editing instructions being used to guide to add target video materials in the video forming dimensions.

S102: in response to receiving the target video materials in the video forming dimensions, integrating the target video materials by using a target video script, to generate the recommendation video corresponding to the target book list, the target video script indicating a target video frame associated with a video forming dimension in the recommendation video, and a display position of a target video material corresponding to the video forming dimension in the target video frame.

For the foregoing S101, a possible case of determining to generate the recommendation video for the target book list is described in detail by using the foregoing described book reading platform as an example.

For example, in the book reading platform, not only book lists shown in a list form or in another possible form may be specifically displayed on the book list recommendation page or on the topic discussion page for discussing the book list, but also indication information for generating the recommendation video, for example, an icon for generating the recommendation video may be displayed. For example, a user issues a recommended book list on the book reading platform, for example, provides a plurality of books of a novel type in a commenting manner under a novel topic, and the books are identified as a book list. In this case, correspondingly, when it is detected that there is a book list, a corresponding icon for generating the recommendation video is displayed at an associated position.

For example, FIG. 2 is a schematic diagram corresponding to an icon that is for generating a recommendation video and that is displayed on a topic discussion page according to an embodiment of the present disclosure. The schematic diagram specifically shows information "Strongly recommend the following novels: "Novel A" by the author A, and "Novel B" and "Novel C" by the author B that were published last year" sent by the user in the commenting manner. "Novel A", "Novel B", and "Novel C" involved may be specifically used to form the target book list. The icon for generating the recommendation video is specifically displayed at an associated position on the right of the comment issued by the user. In response to a trigger operation on the icon, it may be determined that a current operation intention of the user includes generating the recommendation video for the target book list, and a video creation page may be displayed.

The displayed video creation page specifically includes the editing instructions respectively corresponding to the plurality of video forming dimensions, and the editing instructions are used to guide to add the target video materials in the video forming dimensions. The editing instructions herein specifically include instruction information displayed in an icon form or in a character form. The video forming dimensions may be divided based on a structure of the video. For example, the video is divided into video clips respectively corresponding to the book list and books in the book list, and is subdivided into a cover frame for displaying the book list and video frames for displaying the books.

In each video forming dimension, related content of the book list or related content of a book may be specifically displayed in an associated manner in a video frame indicated by the video forming dimension. The content includes but is not limited to: a name of the book list, introduction information, a reason for recommendation, book names of the books therein, authors, brief introduction of the books, and the like.

Herein, when the editing instructions respectively corresponding to the plurality of video forming dimensions are displayed, in a possible case, the editing instructions corresponding to the video forming dimensions may be displayed page by page in a book list-book sequence by using a plurality of contiguous pages. For example, FIGS. 3(*a*) and 3(*b*) are schematic diagrams of a video creation page according to an embodiment of the present disclosure. In this manner, the user is prompted, through step indexes, to correspondingly add, on each page, content information of an object indicated by an index of the page.

For example, FIG. 3(*a*) displays a plurality of editing instructions guiding user to add information under an index of "video cover", which are specifically used to introduce the book list. Herein, the editing instructions specifically includes the guide words "a. Add the name of the book list", and an information edit box displayed under the guide words and marking information "Please enter the name of the book list" in the information edit box. After information in the page is supplemented, page turning is performed; or after the user actively turns the page, a page shown in FIG. 3(*b*) may be displayed, and the user continues to supplement content for generating the recommendation video for the first book in the book list. It is easily understood that, for two different objects: the book list and the books, corresponding video forming dimensions are different when the recommendation video is generated, and therefore the corresponding editing instructions are different.

In this manner, the guide words may indicate, to the user on each page, a specific object to which the editing instruction displayed on the page is aimed, so that the user can know which object is currently described, and orderly add description information corresponding to the objects, in which the description information is used as video materials.

In another possible manner, the editing instructions that are in the plurality of video forming dimensions and that is displayed on the video creation page may be specifically selected and displayed based on a requirement of the user. For example, a creation requirement of the user about the recommendation video may be specifically inferred based on a scenario of triggering to generate the recommendation video.

For example, in the scenario of triggering to generate the recommendation video in the video creation page, books that the user want to recommend in this video creation may be first determined based on the information "Strongly recommend the following novels: "Novel A" by the author A, and "Novel B" and "Novel C" by the author B that were published last year" issued by the user, which specifically include "Novel A", "Novel B", and "Novel C", and available video materials, for example, book names of the novels, covers, and author introduction information may be acquired based on the three determined books. However, there is still some information that cannot be determined, for example, a book list name corresponding to the book list, a reason for recommendation, and the like. In addition, the user may also delete some books from these three books or add other books to these three books.

On this basis, when information is displayed on the video creation page, for video forming dimensions the same as those in the example of FIGS. 3(*a*) and 3(*b*), if corresponding information is available, the obtained information is directly displayed, and the corresponding editing instructions may be further used to indicate to confirm or change the information. For information that cannot be obtained, the user may be guided to further fill the information based on the editing instructions in the manner similar to that in FIGS. 3(*a*) and 3(*b*).

For example, FIG. 4 is a schematic diagram of another video creation page according to an embodiment of the present disclosure. In FIG. 4, for the first book "Novel A", different from FIG. 3(*b*), because the book name, the cover, and the brief introduction are available, the corresponding editing instructions may not be displayed, or may be changed to the obtained information and a corresponding confirm or edit button. The part of the reason for recommendation needs to be specifically filled by the user, and therefore the editing instruction of the reason for recommendation may be displayed like that in FIG. 3(*b*).

By comparing the foregoing two manners, it may be determined that on the video creation page, the better manner is to provide some specific and available information to the user, to reduce the burden for querying and collecting information by the user.

On this basis, in this embodiment of the present disclosure, the following two different manners are further selected to provide optional video materials for the user:

(1) In response to a trigger operation on any editing instruction, obtain at least one first reference material in a video forming dimension that corresponds to the editing instruction and that is associated with the target book list; and in response to a selection operation on the first reference material, use the selected first reference material as a target video material in the video forming dimension.

Figure 5:
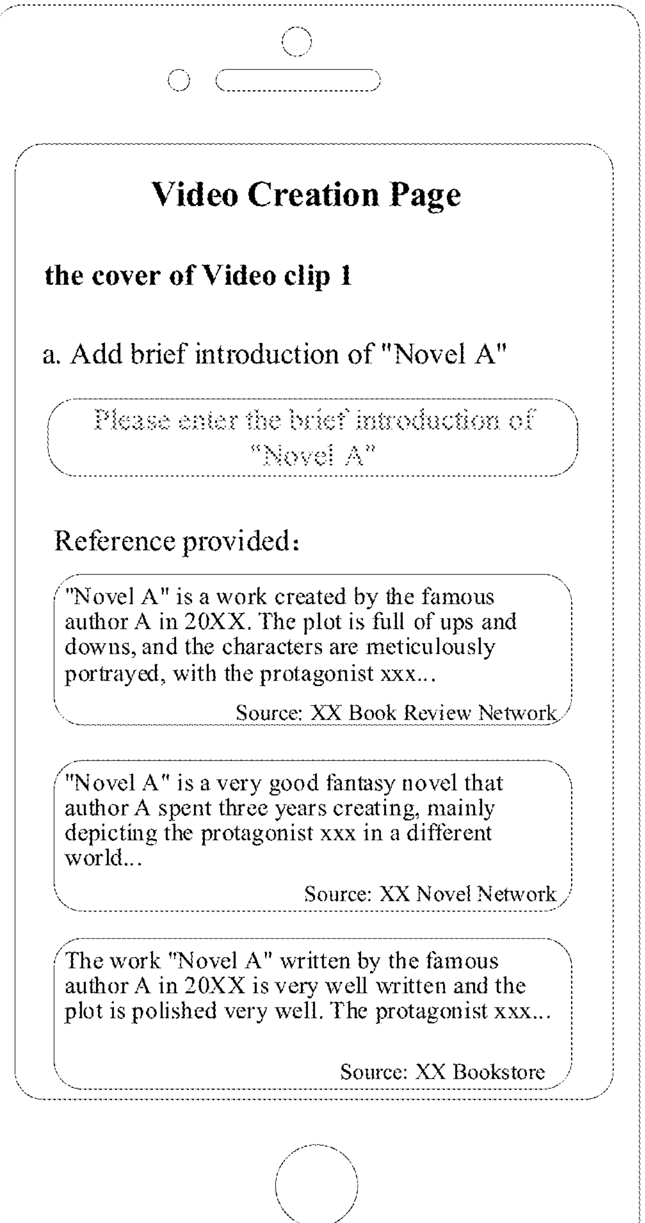
FIG. 5 is a schematic diagram of a third video creation page according to an embodiment of the present disclosure.

In this case, for example, FIG. 5 is a schematic diagram of a third video creation page according to an embodiment of the present disclosure. Using an example in which the selected video forming dimension includes a cover of a video clip 1, the corresponding editing instruction may specifically include a text box marking "Please fill brief introduction of the book". To be specific, it is determined that the brief introduction of the book is displayed on the cover. In response to a trigger operation on the text box, a plurality of first reference materials displayed on the lower part of the page, for example, the first reference materials may be brief introductions to "Novel A" from different web pages. These first reference materials may be directly selected for use as the target video material in this video forming dimension, or may be edited after being selected, and the edited first reference materials are used as the target video material.

(2) In response to receiving input information under any editing instruction, determine, based on a video forming dimension corresponding to the editing instruction, a plurality of book description dimensions corresponding to the target book list, and determine, based on the input information, a target book description dimension from the plurality of book description dimensions; and obtain book information in the target book description dimension from the target book list, and display the book information and the input information in an associated manner.

In this case, an example of another video creation page that can be provided in this embodiment of the present disclosure is first described by using an example. In this example, different from the foregoing example, the editing instructions can be displayed in a more concise manner instead of the guiding manner of editing the book list and the books as a main body in the foregoing example. In this manner, flexibility of creating the recommendation video can be improved, and this manner does not need to be constrained to the described content in a plurality of dimensions provided in the video creation page.

Figures 6A, 6B:
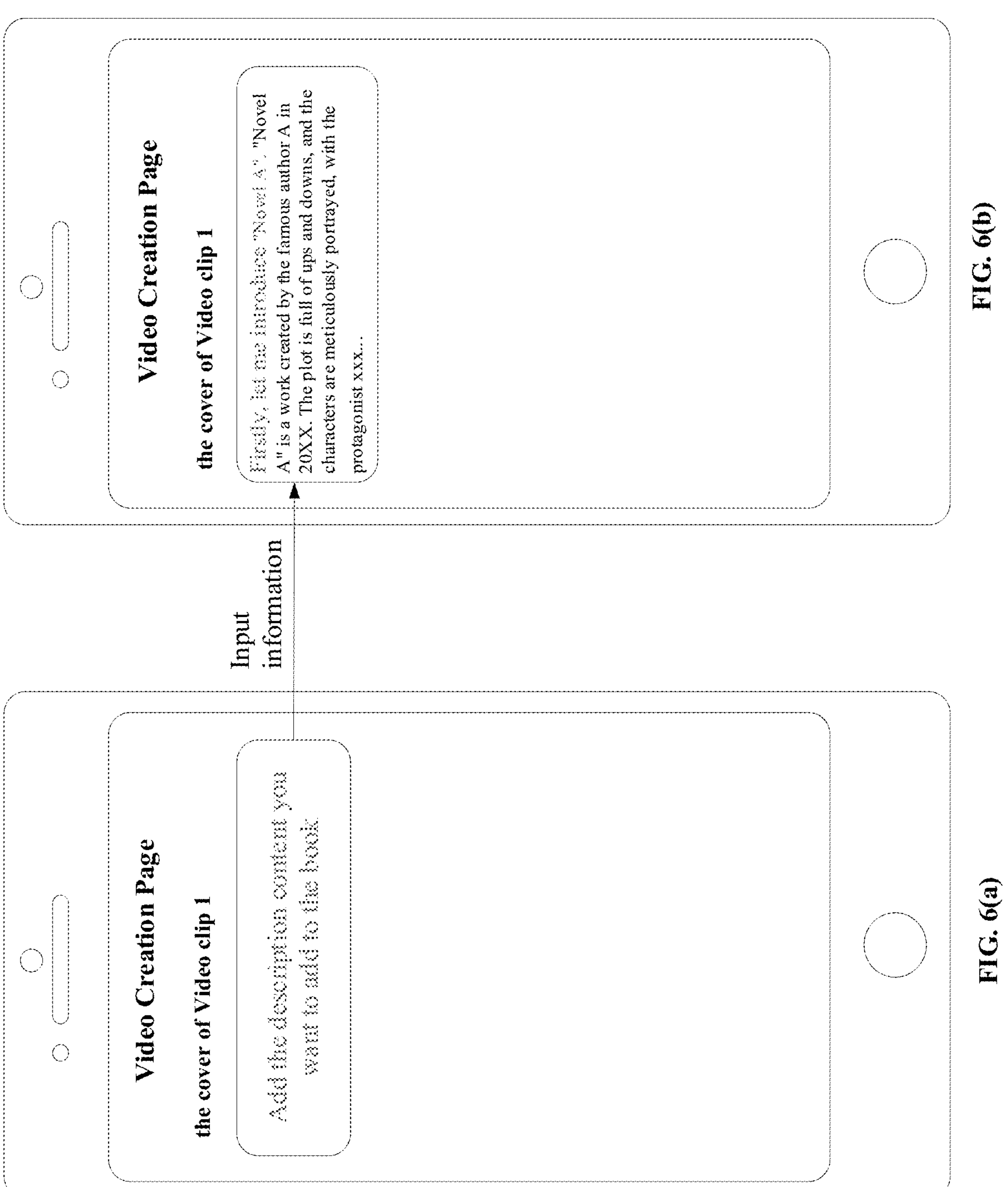
FIGS. 6(*a*) and 6(*b*) are schematic diagrams of a fourth video creation page according to an embodiment of the present disclosure.

For example, FIGS. 6(*a*) and 6(*b*) are schematic diagrams of a fourth video creation page according to an embodiment of the present disclosure. First, with reference to a page schematic diagram shown in FIG. 6(*a*), in this example, the editing instruction may specifically include only one text box, and guide, by using text information "input description content expected to be added to the book", the user to describe the book on the cover of the video clip 1. The user may type in, at this position, information expected to be described for the book in the recommendation video.

Herein, it may be determined that the editing instruction specifically corresponds to the cover the video clip 1, and on the cover of the video clip 1, a plurality of book description dimensions, including the book name, the cover, the book brief introduction, and the like may be predetermined. If the input text including "first, introduce "Novel A"" is received, it may be determined, in a semantic recognition manner, that the user specifically wants to introduce "Novel A" in the cover, that is, display the book brief introduction. In this case, the book brief introduction may be specifically used as the target book description dimension.

Then, book information in the target book description dimension may be obtained from the target book list, and the information is displayed in an associated manner. Herein, in a possible case, recommendation display may be performed below in the manner shown in FIG. 5, or supplemented display may be performed directly after the text input by the user, as shown in FIG. 6(*b*). Details are not described herein again.

In this way, a corresponding target video material can be obtained in each video forming dimension. For example, the target video materials corresponding to the video forming dimensions may as follows. The video forming dimension includes a video cover, a cover of video clip 1, video content of the video clip 1, a cover of video clip 2, and video content of the video clip 2. The target video materials corresponding to the video cover may include the book list name and introduction information of the book list. The target video materials corresponding to the cover of the video clip 1 may include the cover and book name of "Novel A". The target video material corresponding to the video content of the video clip 1 may include brief introduction content of "Novel A". The target video materials corresponding to the cover of the video clip 2 may include the cover and book name of "Novel B". The target video material corresponding to the video content of the video clip 2 may include brief introduction content of "Novel B".

For the foregoing S102, after the target video materials in the video forming dimensions are received, the target video materials may be integrated based on a target video script, to generate the recommendation video corresponding to the target book list.

Herein, the target video script specifically indicates an associated target video frame of each video forming dimension in the recommendation video. For example, for the video forming dimension of the foregoing video cover, the specific associated target video frame is the first video frame of the recommendation video. In addition, the target video script is further used to indicate a display position of the target video material corresponding to the video forming dimension in the target video frame. For example, for the video cover, the target video materials may be specifically zoomed in for display in a full-screen manner.

Figure 7:
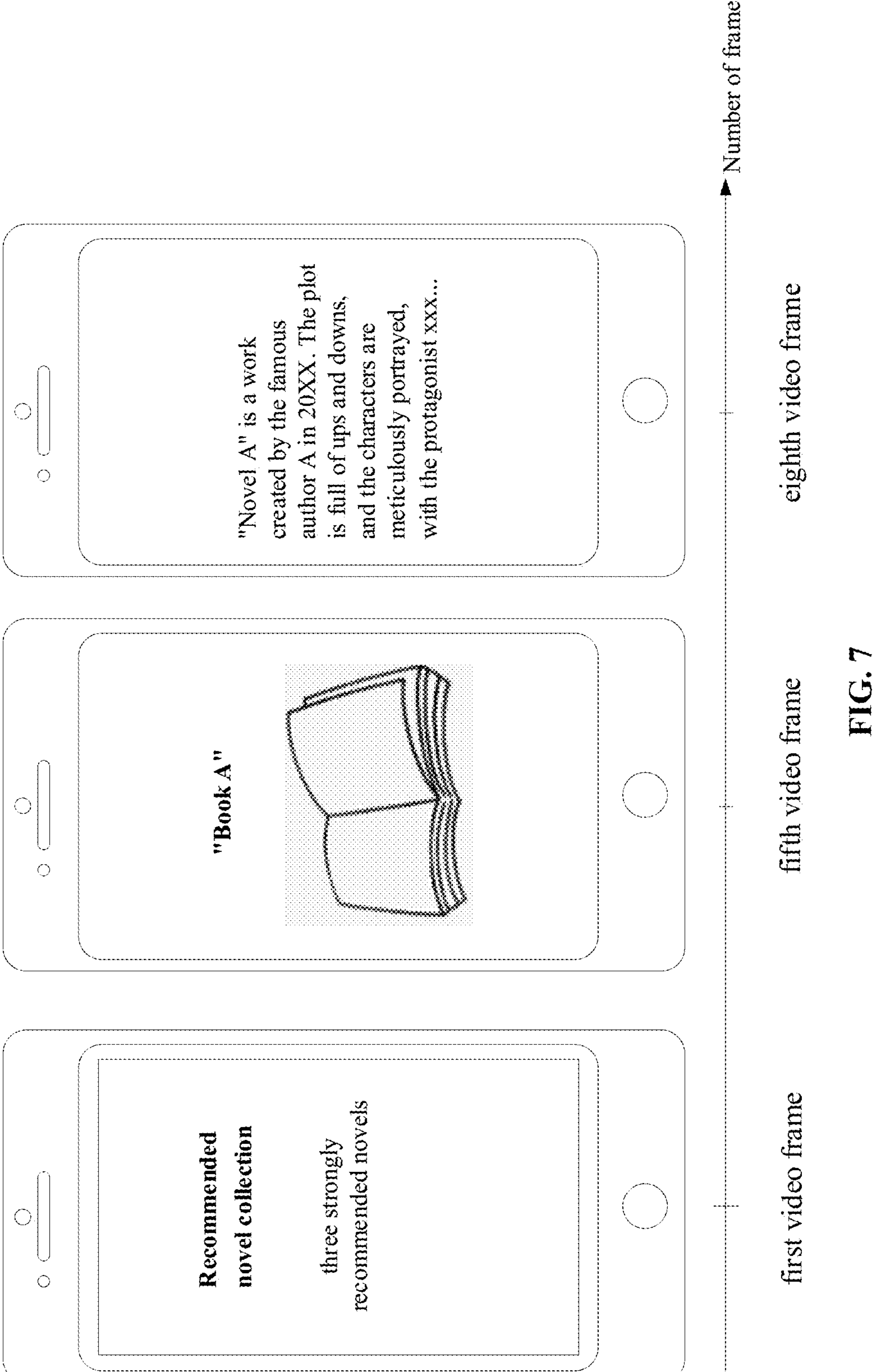
FIG. 7 is a schematic diagram of a plurality of video frames in a recommendation video according to an embodiment of the present disclosure.

In this way, for each target video material that is obtained as described above, a corresponding video frame and a specific display position in the video frame may be determined based on the target video script. For example, FIG. 7 is a schematic diagram of a plurality of video frames in a recommendation video according to an embodiment of the present disclosure.

The first video frame displays the video cover, and the video cover is displayed in full screen, and includes the book list name "Recommended novel collection" and the book list introduction information "three strongly recommended novels". The fifth video frame starts to display related information of the first book, where the fifth video frame displays a cover of the video clip 1, and the cover specifically displays a cover and a book name of the first book "Book A". The eighth video frame starts to display video content corresponding to the video clip 1, including brief introduction content of "Novel A".

Only a possible video script is listed above. In a specific implementation, there may be a plurality of video scripts that can be selected. A difference in video scripts may be specifically reflected in a difference in content structure arrangement. For example, the book list is first described in the foregoing example, and then the books are described one by one. However, in another possible manner, the plurality of books may also be compared for description, and are not separately described in different video clips. In addition, the difference in video scripts may also be reflected in a difference in display positions of the target video materials. Details are not described herein again.

For a plurality of optional video scripts, in a specific implementation, identification information respectively corresponding to the plurality of video scripts may be displayed, and the identification information includes first identification information and second identification information. A first preview video is generated in response to a selection operation on the first identification information based on a video script corresponding to the first identification information, and the target video materials in the video forming dimensions; and the first preview video is displayed, and switching is performed, in response to a switch selection operation on the second identification information, to display a second preview video under a video script corresponding to the second identification information.

For example, corresponding to the foregoing described possible difference between video scripts, different video scripts may be enabled to reflect different styles, for example, focus on displaying a reading style of the book content, or focus on a commenting style of comparison.

Before the recommendation video is specifically generated, the user may preview the video, to determine whether the video needs to be supplemented or modified, or may generate the video for posting. During preview, one of the plurality of video scripts may be selected to generate a preview video. The plurality of video scripts may be provided for the user in a manner of displaying identification information respectively corresponding to the video scripts. The identification information may be specifically displayed by using text information such as "reading style" and "commenting style" described above, or in another optional manner. This is not limited herein.

After any piece of identification information is selected therefrom, the first preview video may be generated under the corresponding video script by using the target video materials in the video dimensions, and the first preview video is displayed. For a manner of generating the preview video, reference may be made to the foregoing description for details. Details are not described herein again. In addition, in the case where the user is not satisfied with the preview video generated under the selected video script, the user may also continue to switch to another optional video script to view a corresponding preview video.

To enable the user to obtain a desirable result after viewing a relatively small quantity of preview videos, and to reduce computing power resources consumed during generation of the preview video for a plurality of times, a video script that is more suitable for selection during generation of the recommendation video is determined, and then identification information corresponding to the determined video script is displayed in a recommended manner.

In a specific implementation, a book list type of the target book list may be determined, to determine a video style matching the target book list based on the book list type, in which the book list type of the target book list is determined based on a book type corresponding to a plurality of books in the target book list; and the target video script matching the video style is determined from the plurality of video scripts, and identification information corresponding to the target video script is displayed in a recommended manner.

For example, because the video script is predetermined, the video style may be predetermined accordingly. For example, the video style may further include "ancient style", "modern style", "light humor style", "sad style", and the like. Different video styles may correspond to different features of the books. For example, in the "ancient style", the features of the books relatively match history novels or ancient love novels. Therefore, in the case where book types of a plurality of books in a particular target book list are all ancient history genres, the video script corresponding to the "ancient style" rather than the video script corresponding to the "modern style" is more suitable for selection.

Therefore, a book list type of the target book list may be first determined based on the target book list, and may be specifically determined based on book types corresponding to a plurality of books in the book list. The book types may be specifically obtained based on content features corresponding to the books. When the content features are determined, reference may be made to specific optional types to which video styles of currently optional video scripts are oriented. A corresponding video style may be determined based on the book list type of the book list, then the target video script corresponding to the video style is determined, and the target video script may be display to the user in a recommended manner.

In the foregoing example, text and picture content in the recommendation video are specifically described. The video forming dimensions may further specifically include a background sound dimension. A target video material in the background sound dimension may be specifically obtained in the following manner: in response to receiving an edit operation on an editing instruction in the background sound dimension, determining a selected to-be-recorded audio clip in background audio in the recommendation video; playing a currently generated preview video, and receiving recorded audio for the to-be-recorded audio clip when playing to a video clip corresponding to the to-be-recorded audio clip in the preview video; and updating the to-be-recorded audio clip by using the recorded audio, to obtain the video material in the background sound dimension.

In a possible manner, a music clip may be selected as background sound of the video, and the user may also input audio in a recording manner as the background sound.

Figure 8:
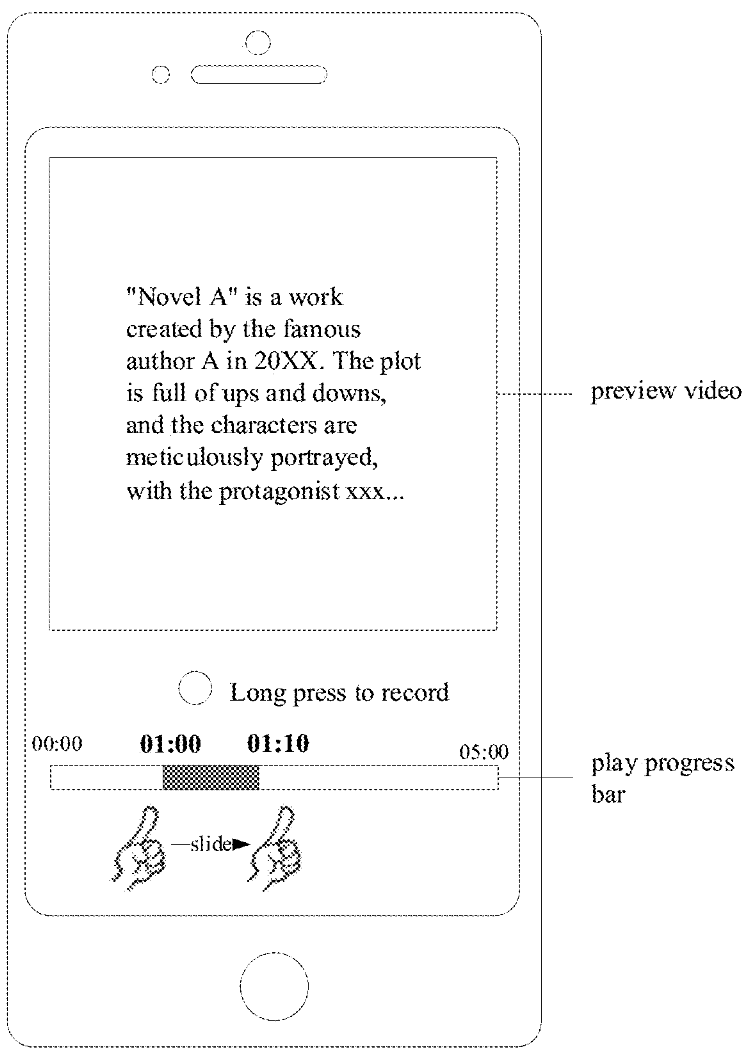
FIG. 8 is a schematic diagram during edition of background sound according to an embodiment of the present disclosure.

In a process of editing the background sound, the user may specifically select an audio clip in audio for re-recording. For example, FIG. 8 is a schematic diagram during edition of background sound according to an embodiment of the present disclosure. In the schematic diagram, the preview video is displayed on the upper part, and a play progress bar and total duration of the complete background sound corresponding to the preview video are displayed on the lower part.

When the video is previewed, a page in the example may be entered specifically based on an editing instruction such as an audio record button, and then a to-be-recorded audio clip, for example, an audio clip within time 01:00-01:10 in the figure may be marked in a manner of sliding in the play progress bar. To record this audio clip and maintain synchronization between picture content and recorded audio indication content, the currently generated preview video may be first played and then recorded audio of the to-be-recorded audio clip is received at the same time. Specifically, a record button may be touched and held, to continuously record the audio. Finally, the to-be-recorded audio clip is updated with the newly recorded audio, to obtain the video material in the background sound dimension.

After the foregoing steps are completed, whether to generate the recommendation video may be determined by checking the preview video.

In this embodiment of the present disclosure, after the recommendation video is generated, the recommendation video may be further specifically played on a video recommendation page, and a video clip that is associated with each book in the target book list and that is in the recommendation video is marked in a progress bar of the recommendation video; and in response to a selection operation on any video clip, jumping is performed to play the recommendation video from a start play position of the recommendation video in the video clip, and read information of a book associated with the video clip is displayed.

Figure 9:
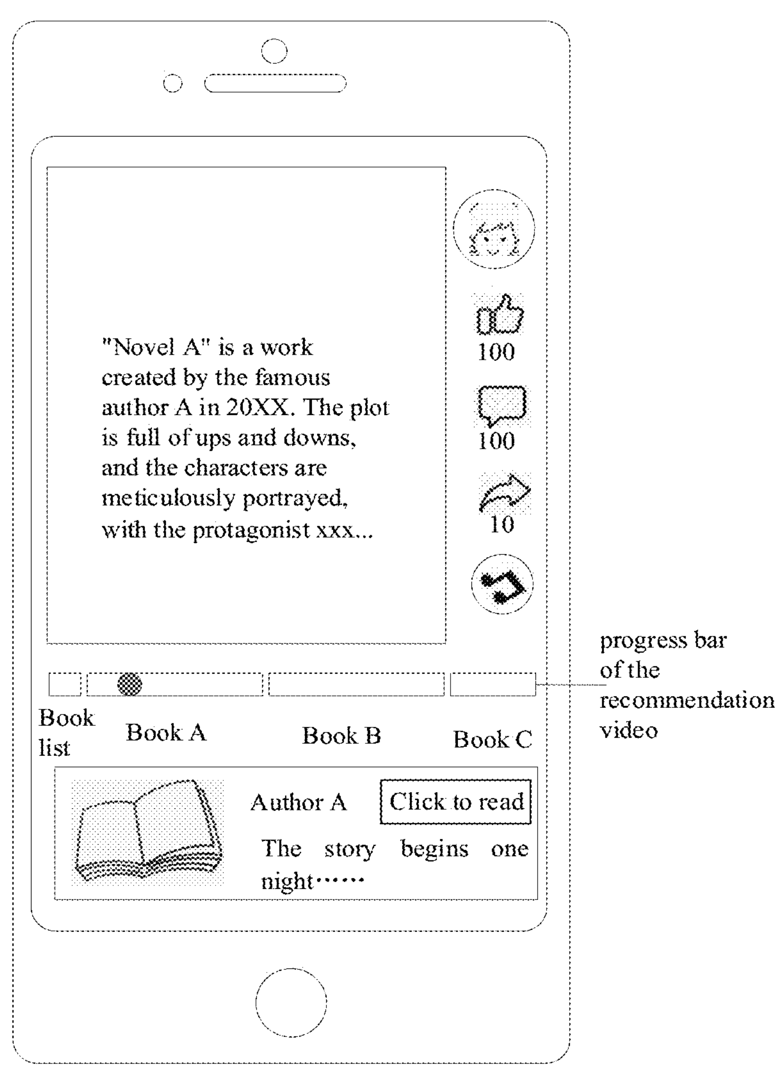
FIG. 9 is a schematic diagram of a video recommendation page according to an embodiment of the present disclosure.

For example, FIG. 9 is a schematic diagram of a video recommendation page according to an embodiment of the present disclosure. The recommendation video is displayed above, and the progress bar of the recommendation video is displayed below. The progress bar is displayed in a form of a plurality of segments, and a current play position is represented as a black solid circle. It can be determined from the example diagram that a video clip corresponding to "Book A" is currently displayed. Correspondingly, corresponding read information, including information such as the cover and the author of "Book A", and some readable content, is displayed below in an associated manner. In addition, a corresponding jump-to-read link is further displayed, and is marked by using text "tap to read".

A video clip associated with another book may also be played at a start play position of the corresponding video clip after a trigger operation of the user. Correspondingly, when a video clip corresponding to a book is displayed in a jumping manner, read information corresponding to the book is correspondingly displayed in a switching manner.

Herein, if a video clip corresponding to the book list is displayed in a switching manner, a plurality of books in the book list and jump-to-read links corresponding to the books may also be correspondingly displayed. This may be specifically determined based on an actual situation, and is not limited herein.

A person skilled in the art may understand that, in the foregoing methods of specific implementations, the order in which the steps are written does not means a strict order of execution, and does not constitute any limitation on the implementation process, and the specific order of execution of the steps should be determined by functions and possible internal logic of the steps.

Based on a same inventive concept, an embodiment of the present disclosure further provides a video generation apparatus corresponding to the video generation method. Because the apparatus in this embodiment of the present disclosure resolves the problem in a principle similar to that of the foregoing video generation method in embodiments of the present disclosure, for the implementation of the apparatus, reference may be made to the implementation of the method, and details are not described again.

Figure 10:
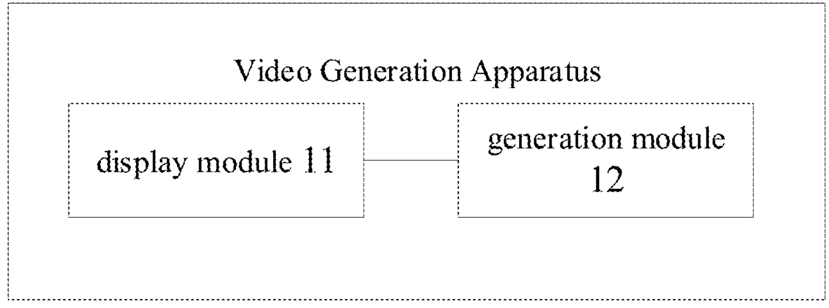
FIG. 10 is a schematic diagram of a video generation apparatus according to an embodiment of the present disclosure.

FIG. 10 is a schematic diagram of a video generation apparatus according to an embodiment of the present disclosure. The apparatus includes: a display module 11 and a generation module 12.

The display module 11 is configured to display a video creation page in response to a request to generate a recommendation video for a target book list, where the video creation page includes editing instructions respectively corresponding to a plurality of video forming dimensions, and the editing instructions are used to guide to add target video materials in the video forming dimensions; and The generation module 12 is configured to, in response to receiving the target video materials in the video forming dimensions, integrate the target video materials by using a target video script, to generate the recommendation video corresponding to the target book list.

The target video script indicates a target video frame associated with a video forming dimension in the recommendation video, and a display position of a target video material corresponding to the video forming dimension in the target video frame.

In an optional implementation, after displaying the editing instructions in the video creation page, the display module 11 is further configured to: in response to a trigger operation on any editing instruction, obtain at least one first reference material in a video forming dimension that corresponds to the editing instruction and that is associated with the target book list; and in response to a selection operation on the first reference material, use the selected first reference material as a target video material in the video forming dimension.

In an optional implementation, after displaying the editing instructions in the video creation page, the display module 11 is further configured to: in response to receiving input information under any editing instruction, determine, based on a video forming dimension corresponding to the editing instruction, a plurality of book description dimensions corresponding to the target book list, and determine, based on the input information, a target book description dimension from the plurality of book description dimensions; and obtain book information in the target book description dimension from the target book list, and display the book information and the input information in an associated manner.

In an optional implementation, after responding to receiving the target video materials in the video forming dimensions, the generation module 12 is further configured to: display identification information respectively corresponding to a plurality of video scripts, in which the identification information includes first identification information and second identification information, and generate a first preview video in response to a selection operation on the first identification information based on a video script corresponding to the first identification information, and the target video materials in the video forming dimensions; and display the first preview video, and switch, in response to a switch selection operation on the second identification information, to display a second preview video under a video script corresponding to the second identification information.

In an optional implementation, when displaying the identification information respectively corresponding to the plurality of video scripts, the generation module 12 is further configured to: determine a book list type of the target book list, to determine a video style matching the target book list based on the book list type, in which the book list type of the target book list is determined based on a book type corresponding to a plurality of books in the target book list; and determine the target video script matching the video style from the plurality of video scripts, and display identification information corresponding to the target video script in a recommended manner.

In an optional implementation, the video forming dimensions include a background sound dimension, and the generation module 12 may obtain a target video material in the background sound dimension in the following manner: in response to receiving an edit operation on an editing instruction in the background sound dimension, determining a selected to-be-recorded audio clip in background audio in the recommendation video; playing a currently generated preview video, and receiving recorded audio for the to-be-recorded audio clip when playing to a video clip corresponding to the to-be-recorded audio clip in the preview video; and updating the to-be-recorded audio clip by using the recorded audio, to obtain the video material in the background sound dimension.

In an optional implementation, after generating the recommendation video corresponding to the target book list, the generation module 12 is further configured to: play the recommendation video on a video recommendation page, and mark, in a progress bar of the recommendation video, a video clip that is associated with each book in the target book list and that is in the recommendation video; and in response to a selection operation on any video clip, jump to a start play position of the video clip in the recommendation video and play from the starting position, and display read information of a book associated with the video clip.

Reference may be made to related descriptions in the foregoing method embodiment for descriptions of processing procedures of the modules in the apparatus, and procedures of interactions between the modules.

Figure 11:
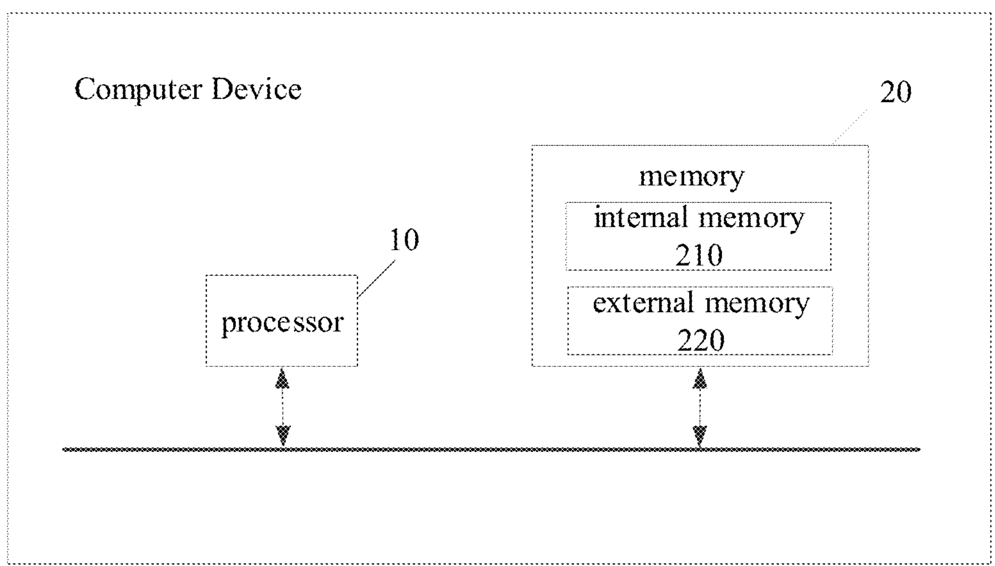
FIG. 11 is a schematic diagram of a computer device according to an embodiment of the present disclosure.

An embodiment of the present disclosure further provides a computer device. FIG. 11 is a schematic structural diagram of a computer device according to an embodiment of the present disclosure. The computer device includes:

- a processor 10 and a memory 20, in which the memory 20 stores a machine-readable instruction that can be executed by the processor 10, the processor 10 is configured to execute the machine-readable instruction stored in the memory 20, and when the machine-readable instruction is executed by the processor 10, the processor 10 performs the following steps:
- displaying a video creation page in response to a request to generate a recommendation video for a target book list, where the video creation page includes editing instructions respectively corresponding to a plurality of video forming dimensions, and the editing instructions are used to guide to add target video materials in the video forming dimensions; and in response to receiving the target video materials in the video forming dimensions, integrating the target video materials by using a target video script, to generate the recommendation video corresponding to the target book list, where the target video script indicates a target video frame associated with a video forming dimension in the recommendation video, and a display position of a target video material corresponding to the video forming dimension in the target video frame.

The memory 20 includes an internal memory 210 and an external memory 220. The internal memory 210 herein is also referred to an inner memory, and is configured to temporarily store operational data in the processor 10, and data exchanged with the external memory 220 such as a hard disk. The processor 10 exchanges data with the external memory 220 by using the internal memory 210.

For a specific execution process of the foregoing instruction, reference may be made to the steps of the video generation method in the embodiments of the present disclosure. Details are not described herein again.

An embodiment of the present disclosure further provides a computer-readable storage medium, where the computer-readable storage medium stores a computer program, and when the computer program is run by a processor, the steps of the video generation method in the forgoing method embodiments are performed. The storage medium may be a volatile or non-volatile computer-readable storage medium.

An embodiment of the present disclosure further provides a computer program product. The computer program product carries program code. Instructions included in the program code may be used to perform the steps of the video generation method in the foregoing method embodiments. Reference may be made to the foregoing method embodiments for details. Details are not described herein again.

The computer program product may be realized specifically by means of hardware, software or a combination thereof. In an optional embodiment, the computer program product is specifically embodied as a computer storage medium, and in another optional embodiment, the computer program product is specifically embodied as a software product, such as a software development kit (SDK) or the like.

It may be clearly understood by a person skilled in the art that, for the purpose of convenient and brief description, for a detailed working process of the system and apparatus described above, reference may be made to a corresponding process in the foregoing method embodiments. Details are not described herein again. In several embodiments provided in the present disclosure, it should be understood that the disclosed system, apparatus, and method may be implemented in another manner. The apparatus embodiments described above are merely examples. For example, division into the units is merely logic function division and may be other division in actual implementation. For another example, a plurality of units or components may be combined or integrated into another system, or some features may be ignored or not performed. In addition, the displayed or discussed mutual couplings or direct couplings or communication connections may be implemented by using some communication interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units are integrated into one unit.

When the functions are implemented in the form of a software functional unit and sold or used as an independent product, the functions may be stored in a nonvolatile computer-readable storage medium that can be executed by a processor. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of the present disclosure. The foregoing storage medium includes: any medium that can store program code, for example, a USB flash drive, a removable hard disk, a read-only memory (ROM), a random access memory (RAM), a magnetic disk, or an optical disc.

Finally, it should be noted that the foregoing embodiments are merely specific implementations of the present disclosure, and are used to describe the technical solutions of the present disclosure, but not to limit the technical solutions of the present disclosure, and the protection scope of the present disclosure is not limited thereto. Although the present disclosure has been described in detail with reference to the foregoing embodiments, a person of ordinary skill in the art should understand that any person skilled in the art can still modify the technical solutions recorded in the foregoing embodiments, easily figure out changes, or equivalently replace some of the technical features therein within the technical scope disclosed in the present disclosure. However, these modifications, changes, or replacements do not make the essence of the corresponding technical solutions depart from the spirit and scope of the technical solutions of embodiments of the present disclosure, and should all be covered within the protection scope of the present disclosure. Therefore, the protection scope of the present disclosure shall be subject to the protection scope of the claims.

The invention claimed is:

1. A video generation method, comprising:

displaying a video creation page in response to a request to generate a recommendation video for a first book list, wherein the video creation page comprises editing instructions respectively corresponding to a plurality of video forming dimensions, and the editing instructions are used to guide to add first video materials in the video forming dimensions; and in response to receiving the first video materials in the video forming dimensions, integrating the first video materials by using a first video script, to generate the recommendation video corresponding to the first book list, wherein the first video script indicates a second video frame associated with a video forming dimension in the recommendation video, and a display position of a first video material corresponding to the video forming dimension in the second video frame.

2. The method according to claim 1, wherein after displaying the editing instructions in the video creation page, the method further comprises:

in response to a trigger operation on any editing instruction, obtaining at least one first reference material in a video forming dimension that corresponds to the editing instruction and that is associated with the first book list; and in response to a selection operation on the first reference material, using the selected first reference material as a first video material in the video forming dimension.

3. The method according to claim 1, wherein after displaying the editing instructions in the video creation page, the method further comprises:

in response to receiving input information under any editing instruction, determining, based on a video forming dimension corresponding to the editing instruction, a plurality of book description dimensions corresponding to the first book list, and determining, based on the input information, a first book description dimension from the plurality of book description dimensions; and obtaining book information in the first book description dimension from the first book list, and displaying the book information and the input information in an associated manner.

4. The method according to claim 1, wherein in response to receiving the first video materials in the video forming dimensions, the method further comprises:

displaying identification information respectively corresponding to a plurality of video scripts, wherein the identification information comprises first identification information and second identification information;

generating a first preview video in response to a selection operation on the first identification information based on a video script corresponding to the first identification information, and the first video materials in the video forming dimensions; and displaying the first preview video, and switching, in response to a switch selection operation on the second identification information, to display a second preview video under a video script corresponding to the second identification information.

5. The method according to claim 4, wherein the displaying identification information respectively corresponding to a plurality of video scripts further comprises:

determining a book list type of the first book list, to determine a video style matching the first book list based on the book list type, wherein the book list type of the first book list is determined based on a book type corresponding to a plurality of books in the first book list; and determining the first video script matching the video style from the plurality of video scripts, and displaying identification information corresponding to the first video script in a recommended manner.

6. The method according to claim 1, wherein the video forming dimensions comprise a background sound dimension, and a first video material in the background sound dimension is obtained in the following manner:

in response to receiving an edit operation on an editing instruction in the background sound dimension, determining a selected to-be-recorded audio clip in background audio in the recommendation video;

playing a currently generated preview video, and receiving recorded audio for the to-be-recorded audio clip when playing to a video clip corresponding to the to-be-recorded audio clip in the preview video; and updating the to-be-recorded audio clip by using the recorded audio, to obtain the first video material in the background sound dimension.

7. The method according to claim 1, wherein after generating the recommendation video corresponding to the first book list, the method further comprises:

playing the recommendation video on a video recommendation page, and marking, in a progress bar of the recommendation video, a video clip that is associated with each book in the first book list and that is in the recommendation video; and in response to a selection operation on any video clip, jumping to a start play position of the video clip in the recommendation video and playing from the starting position, and displaying read information of a book associated with the video clip.

8. The method according to claim 2, wherein after displaying the editing instructions in the video creation page, the method further comprises:

in response to receiving input information under any editing instruction, determining, based on a video forming dimension corresponding to the editing instruction, a plurality of book description dimensions corresponding to the first book list, and determining, based on the input information, a first book description dimension from the plurality of book description dimensions; and obtaining book information in the first book description dimension from the first book list, and displaying the book information and the input information in an associated manner.

9. The method according to claim 2, wherein in response to receiving the first video materials in the video forming dimensions, the method further comprises:

displaying identification information respectively corresponding to a plurality of video scripts, wherein the identification information comprises first identification information and second identification information;

generating a first preview video in response to a selection operation on the first identification information based on a video script corresponding to the first identification information, and the first video materials in the video forming dimensions; and displaying the first preview video, and switching, in response to a switch selection operation on the second identification information, to display a second preview video under a video script corresponding to the second identification information.

10. The method according to claim 9, wherein the displaying identification information respectively corresponding to a plurality of video scripts further comprises:

determining a book list type of the first book list, to determine a video style matching the first book list based on the book list type, wherein the book list type of the first book list is determined based on a book type corresponding to a plurality of books in the first book list; and determining the first video script matching the video style from the plurality of video scripts, and displaying identification information corresponding to the first video script in a recommended manner.

11. The method according to claim 3, wherein in response to receiving the first video materials in the video forming dimensions, the method further comprises:

displaying identification information respectively corresponding to a plurality of video scripts, wherein the identification information comprises first identification information and second identification information;

generating a first preview video in response to a selection operation on the first identification information based on a video script corresponding to the first identification information, and the first video materials in the video forming dimensions; and displaying the first preview video, and switching, in response to a switch selection operation on the second identification information, to display a second preview video under a video script corresponding to the second identification information.

12. The method according to claim 11, wherein the displaying identification information respectively corresponding to a plurality of video scripts further comprises:

determining a book list type of the first book list, to determine a video style matching the first book list based on the book list type, wherein the book list type of the first book list is determined based on a book type corresponding to a plurality of books in the first book list; and determining the first video script matching the video style from the plurality of video scripts, and displaying identification information corresponding to the first video script in a recommended manner.

13. The method according to claim 2, wherein the video forming dimensions comprise a background sound dimension, and a first video material in the background sound dimension is obtained in the following manner:

in response to receiving an edit operation on an editing instruction in the background sound dimension, determining a selected to-be-recorded audio clip in background audio in the recommendation video;

playing a currently generated preview video, and receiving recorded audio for the to-be-recorded audio clip when playing to a video clip corresponding to the to-be-recorded audio clip in the preview video; and updating the to-be-recorded audio clip by using the recorded audio, to obtain the video material in the background sound dimension.

14. The method according to claim 3, wherein the video forming dimensions comprise a background sound dimension, and a first video material in the background sound dimension is obtained in the following manner:

in response to receiving an edit operation on an editing instruction in the background sound dimension, determining a selected to-be-recorded audio clip in background audio in the recommendation video;

playing a currently generated preview video, and receiving recorded audio for the to-be-recorded audio clip when playing to a video clip corresponding to the to-be-recorded audio clip in the preview video; and updating the to-be-recorded audio clip by using the recorded audio, to obtain the video material in the background sound dimension.

15. The method according to claim 4, wherein the video forming dimensions comprise a background sound dimension, and a first video material in the background sound dimension is obtained in the following manner:

in response to receiving an edit operation on an editing instruction in the background sound dimension, determining a selected to-be-recorded audio clip in background audio in the recommendation video;

playing a currently generated preview video, and receiving recorded audio for the to-be-recorded audio clip when playing to a video clip corresponding to the to-be-recorded audio clip in the preview video; and updating the to-be-recorded audio clip by using the recorded audio, to obtain the video material in the background sound dimension.

16. The method according to claim 2, wherein after generating the recommendation video corresponding to the first book list, the method further comprises:

playing the recommendation video on a video recommendation page, and marking, in a progress bar of the recommendation video, a video clip that is associated with each book in the first book list and that is in the recommendation video; and in response to a selection operation on any video clip, jumping to a start play position of the video clip in the recommendation video and playing from the starting position, and displaying read information of a book associated with the video clip.

17. The method according to claim 3, wherein after generating the recommendation video corresponding to the first book list, the method further comprises:

playing the recommendation video on a video recommendation page, and marking, in a progress bar of the recommendation video, a video clip that is associated with each book in the first book list and that is in the recommendation video; and in response to a selection operation on any video clip, jumping to a start play position of the video clip in the recommendation video and playing from the starting position, and displaying read information of a book associated with the video clip.

18. A video generation apparatus, comprising:

a display module, configured to display a video creation page in response to a request to generate a recommendation video for a first book list, wherein the video creation page comprises editing instruction respectively corresponding to a plurality of video forming dimensions, and the editing instruction are used to guide to add first video materials in the video forming dimensions; and a generation module, configured to, in response to receiving the first video materials in the video forming dimensions, integrate the first video materials by using a first video script, to generate the recommendation video corresponding to the first book list, wherein the first video script indicates a second video frame associated with a video forming dimension in the recommendation video, and a display position of a first video material corresponding to the video forming dimension in the second video frame.

19. A computer device, comprising: a processor and a memory, wherein the memory stores a machine-readable instruction that can be executed by the processor, the processor is configured to execute the machine-readable instruction stored in the memory, and when the machine-readable instruction is executed by the processor, the processor performs the steps of video generation method, wherein the video generation method comprises:

displaying a video creation page in response to a request to generate a recommendation video for a first book list, wherein the video creation page comprises editing instructions respectively corresponding to a plurality of video forming dimensions, and the editing instructions are used to guide to add first video materials in the video forming dimensions; and in response to receiving the first video materials in the video forming dimensions, integrating the first video materials by using a first video script, to generate the recommendation video corresponding to the first book list, wherein the first video script indicates a second video frame associated with a video forming dimension in the recommendation video, and a display position of a first video material corresponding to the video forming dimension in the second video frame.

20. A non-transitory computer-readable storage medium, wherein the non-transitory computer-readable storage medium stores a computer program, and when the computer program is run by a computer device, the computer device performs the steps of the video generation method according to claim 1.

* * * * *